C. H. BISSELL.
ELECTRICAL FIXTURE.
APPLICATION FILED FEB. 9, 1917.
1,243,800.
Patented Oct. 23, 1917.
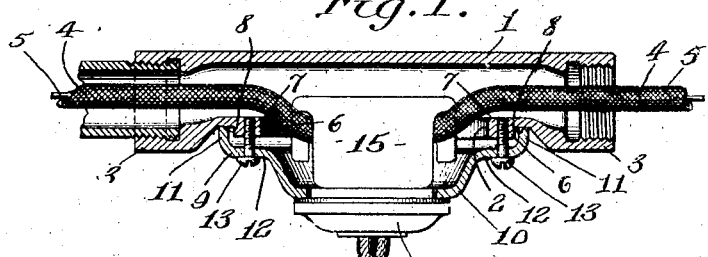
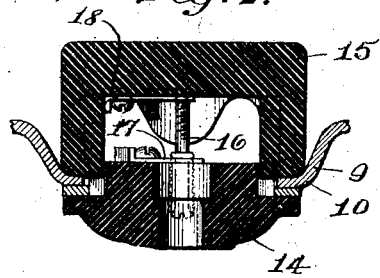
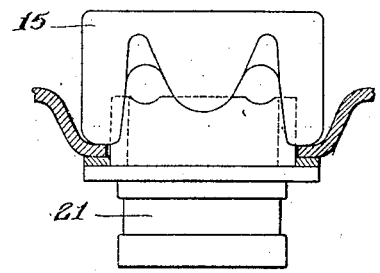
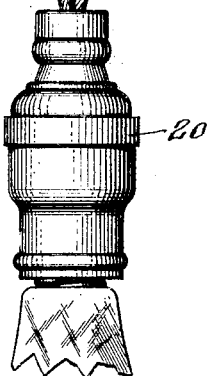
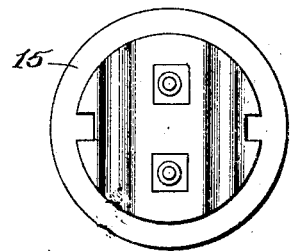
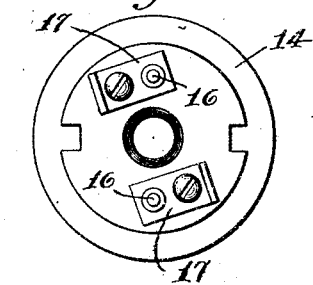
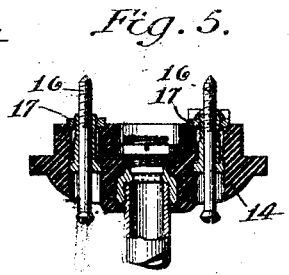
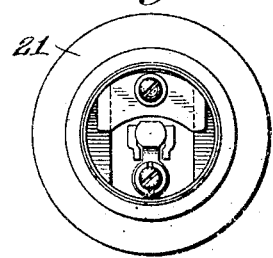
Inventor:
Carl H. Bissell
By Parmer & Braull
Attorneys.

UNITED STATES PATENT OFFICE.

CARL H. BISSELL, OF SYRACUSE, NEW YORK, ASSIGNOR TO CROUSE-HINDS COMPANY, OF SYRACUSE, NEW YORK, A CORPORATION OF NEW YORK.

ELECTRICAL FIXTURE.

1,243,800. Specification of Letters Patent. Patented Oct. 23, 1917.

Original application filed December 27, 1910, Serial No. 599,354. Patent No. 1,216,406. Divided and this application filed February 9, 1917. Serial No. 147,576.

*To all whom it may concern:*

Be it known that I, CARL H. BISSELL, a citizen of the United States, and a resident of Syracuse, in the county of Onondaga and State of New York, have invented a certain new and useful Electrical Fixture, of which the following is a specification.

This invention relates to electrical fixtures, and has for its object a particularly simple and efficient arrangement of mounting the cover or cap of a conduit outlet box onto the box, which cover or cap carries an electrical appliance; and the invention consists in the novel features hereinafter set forth and claimed.

In describing this invention, reference is had to the accompanying drawings in which like characters designate corresponding parts in all the views.

Figure 1 is a longitudinal sectional view of one form of this electrical fixture.

Fig. 2 is a transverse sectional view through the appliance or receptacle carried by the cap of the box, a contiguous part of the cap being also shown.

Figs. 3 and 4 are respectively a plan and an inverted plan view of the base and cap of the appliance shown in Fig. 2.

Fig. 5 is a sectional view through the cap taken at a right angle to the section shown in Fig. 2.

Fig. 6 is an elevation of an appliance provided with another form of cap.

Figs. 7 and 8 are respectively, a plan and inverted plan of the cap shown in Fig. 6.

This electrical fixture comprises generally, a conduit outlet box having an opening in one side, a cover or cap for the opening, and an electrical appliance carried by the cover or cap.

1 designates the box which is generally circular in general outline in plan, and formed with an opening 2 in one side wall and with one or more means, as an internally threaded nipple 3 for connection with conduits 4 inclosing the wires 5. The margin or flange of the wall 6 around the opening 2 is formed with the inner corner of its inner edge rounding as at 7 in order that the wires passing over said edge will not have their insulation cut, and said wall 6 is also formed with a depressed seat 8 on its outer side which seat 8 is remote from the inner edge of the wall around the opening 2.

9 is the cap which is here shown as formed up out of sheet metal and as having a central offset portion 10, a marginal annular flange 11 and a substantially flat portion 12 adjacent the flange 11. The flange 11 seats at its edge in the seat 8 and the flat portion 12 is spaced apart from the flange or wall 8.

The cap is secured to the box by fastening members as screws 13 extending through the flat portion 12 and the opposing thickened portion of the wall or margin 6.

14 and 15 designate the opposing cap and base of an electrical appliance supported in the opening of the offset portion 10 of the cap, and clamped on the margin around the opening in the central offset portion in any suitable manner, as by screws 16 extending through terminals 17 of the cap and into terminals 18 on the base. The screws 16 mechanically connect the base and cap together, and also electrically connect the terminals of the base and cap. The terminals 18 of the base are provided with suitable binding devices as screws 19 with which the wires 5 are engaged. The cap shown in Figs. 1, 2, 3, 4, and 5 is designed to support a drop light 20, and the cap 21ᵃ shown in Figs. 6, 7, 8 is provided with a lamp socket in which an electric lamp may be turned.

The electrical appliance, and the manner in which it is connected to the cap of the box, form the subject matter of my pending application, Sr. No. 599,354, filed Dec. 27, 1910 of which application this is a division.

What I claim is:

1. An electrical fixture comprising a conduit outlet having an opening in one wall, a cap having a marginal annular flange seated at its edge upon the face of the wall around the opening, the cap having a central offset portion formed with an opening, fastening screws extending through the cap between its marginal flange and the central offset and into said wall of the box, and a two-part electrical appliance extending through the opening of said offset portion and having opposing surfaces clamping upon inner and outer surfaces of the offset portion, substantially as and for the purpose described.

2. An electrical fixture comprising a conduit outlet box formed with an opening in one wall, the wall surrounding the opening having rounding surfaces in its edge portion over which the wires pass, and a depressed seat on the outer face thereof remote from the edge of said wall, a cap having a marginal annular flange having its edge engaged with said seat, fastening means extending through the cap and into said wall of the box between the said seat and the opening in the wall, the cap being formed with a central opening and an electrical appliance including a part extending through said wall and clamped upon the inner and outer surfaces of the cap, substantially as and for the purpose specified.

3. An electrical fixture comprising a conduit outlet box having an opening in one wall, a cap having a circumferential annular flange seated at its edge on the margin of the wall around the opening along a line spaced apart from the edge of said wall, the portion of the cap adjacent the flange being spaced apart from the outer face of said wall, fastening members extending through the portion of the cap adjacent the flange and into said wall, and an electrical appliance supported by the cap, substantially as and for the purpose described.

4. An electrical fixture comprising a conduit outlet box having an opening in one wall, a cap having a marginal annular flange, and a central offset portion, the flange having its edge seated on the margin of the wall around the opening along a line spaced apart from the edge of said wall, and the part of the cap adjacent said flange being spaced apart from the underlying portion of the margin of said wall around the opening, fastening members extending through said part of the cap and the underlying portion of said wall of the box, and an electrical appliance carried by the offset portion of the cap, substantially as and for the purpose specified.

In testimony whereof, I have hereunto signed my name, at Syracuse, in the county of Onondaga, and State of New York, this 29th day of December, 1916.

CARL H. BISSELL.